United States Patent
Raffa et al.

(10) Patent No.: US 9,377,854 B2
(45) Date of Patent: Jun. 28, 2016

(54) TECHNOLOGIES FOR REMOTELY CONTROLLING A COMPUTING DEVICE VIA A WEARABLE COMPUTING DEVICE

(71) Applicant: Intel Corporation, Santa Clara, CA (US)

(72) Inventors: Giuseppe Raffa, Portland, OR (US); Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 14/228,875

(22) Filed: Mar. 28, 2014

(65) Prior Publication Data

US 2015/0277557 A1    Oct. 1, 2015

(51) Int. Cl.
*G06F 3/01*    (2006.01)
*G06F 1/16*    (2006.01)
*G01D 5/26*    (2006.01)

(52) U.S. Cl.
CPC ........ *G06F 3/014* (2013.01); *G01D 5/26* (2013.01); *G06F 1/163* (2013.01)

(58) Field of Classification Search
CPC ... G06F 3/0346; G06F 3/0317; G06F 3/0304; G06F 3/03; G06F 3/033
See application file for complete search history.

(56) References Cited

U.S. PATENT DOCUMENTS

| 2007/0252821 | A1* | 11/2007 | Hollemans et al. | 345/173 |
| 2011/0080339 | A1* | 4/2011 | Sun et al. | 345/157 |
| 2011/0112793 | A1* | 5/2011 | Diebold et al. | 702/141 |
| 2014/0063055 | A1* | 3/2014 | Osterhout et al. | 345/633 |

OTHER PUBLICATIONS

Wikipedia.org, "Optical mouse," Wikipedia, The Free Encyclopedia, retrieved from: <http://en.wikipedia.org/w/index.php?title=Optical_mouse&oldid=597912117>, edited Mar. 3, 2014, 4 pages.
Wikipedia.org, "Wearable computer," Wikipedia, The Free Encyclopedia, retrieved from: <http://en.wikipedia.org/w/index.php?title=Wearable_computer&oldid=597396973>, edited Feb. 27, 2014, 10 pages.
Wikipedia.org, "Piezoelectric sensor," Wikipedia, The Free Encyclopedia, retrieved from: <http://en.wikipedia.org/w/index.php?title=Piezoelectric_sensor&oldid=594736589>, edited Feb. 9, 2014, 4 pages.
Wikipedia.org, "Push-button," Wikipedia, The Free Encyclopedia, retrieved from: <http://en.wikipedia.org/w/index.php?title=Push-button&oldid=592686354>, edited Jan. 27, 2014, 2 pages.

* cited by examiner

*Primary Examiner* — Dwayne Bost
*Assistant Examiner* — Christopher Kohlman
(74) *Attorney, Agent, or Firm* — Barnes & Thornburg LLP

(57) ABSTRACT

Technologies for remotely controlling a separate computing device includes a wearable computing device to receive sensor data from an optical sensor of the wearable computing device. The sensor data comprises data is indicative of a skin surface of a forearm of a user of the wearable computing device. The wearable computing device generates control data based on the received sensor data. The generated control data is transmitted to the separate computing device. In some embodiments, an x-coordinate is generated based on detection of longitudinal movement of the wearable computing device relative to the skin surface of the forearm of the user and a y-coordinate is generated based on detection of rotational movement of the wearable computing device relative to the skin surface of the forearm of the user.

25 Claims, 4 Drawing Sheets

TECHNOLOGIES FOR REMOTELY CONTROLLING A COMPUTING DEVICE VIA A WEARABLE COMPUTING DEVICE

BACKGROUND

Modern consumer electronic devices such as laptops, desktops, mobile computing devices, televisions, audio devices, and video devices have become ubiquitous with everyday life so much so that it is not uncommon for a person to interact with a large number of such devices throughout the day. As a result, consumer electronic devices are increasingly finding their way into consumers' homes. Each consumer electronic device typically requires a bulky remote control for device interaction and control.

Mobile computing devices have become important tools for personal, business, and social uses. The portability of mobile computing devices is increasing as the size of the devices decrease and processing power increases. In fact, many mobile computing devices are sized to be hand-held and/or worn by the user to improve ease of use. Further, many modern mobile computing devices are capable of communicating with other devices and/or connecting to various data networks, including the Internet, to retrieve and receive data communications. As such, modern mobile computing devices are powerful, often personal, tools untethered to a particular location.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
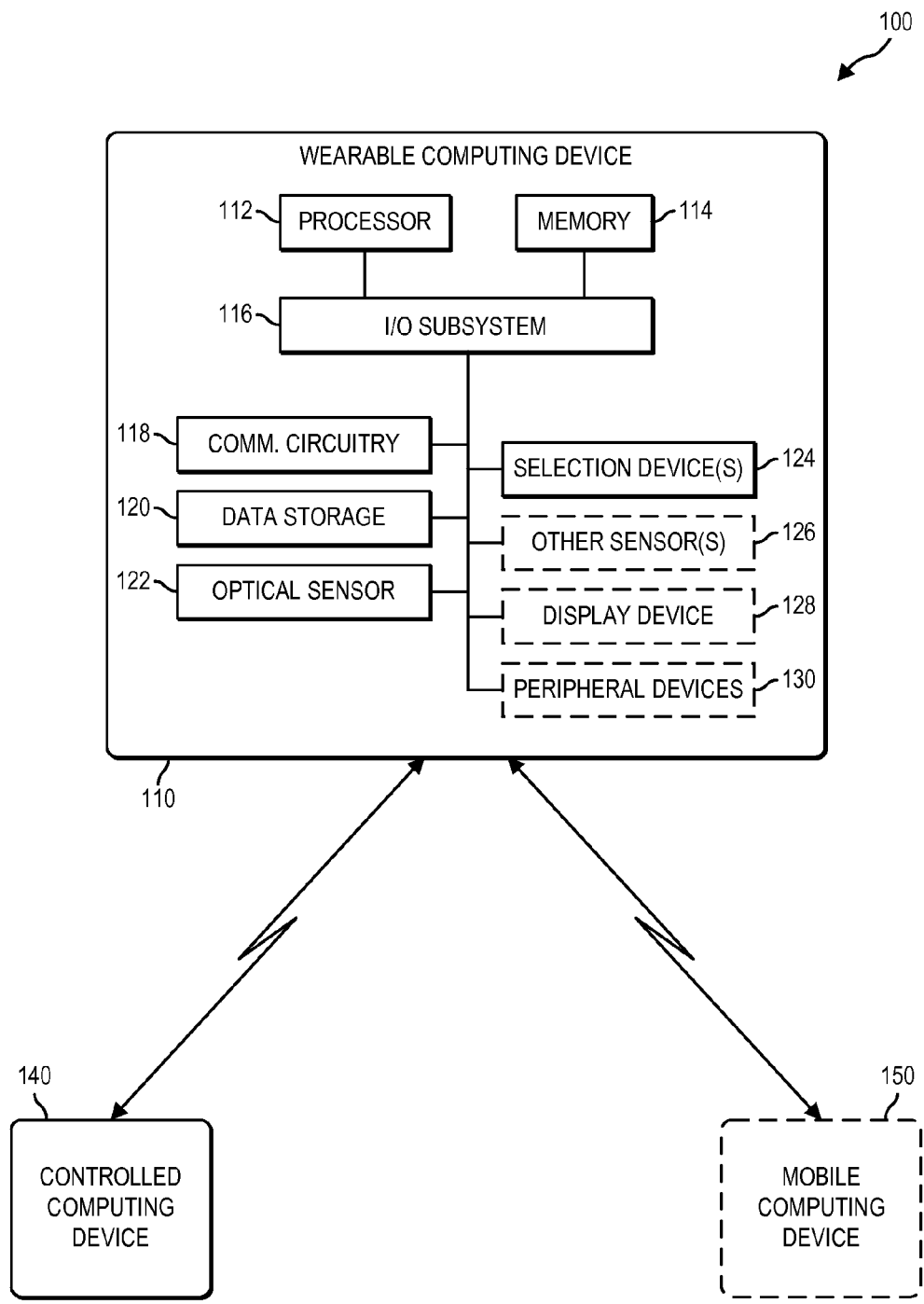
FIG. 1 is a simplified block diagram of at least one embodiment of a system for remotely controlling a computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for remotely controlling a computing device includes a wearable computing device 110 and a controlled computing device 140, which wirelessly communicate with each other. In some embodiments, the wearable computing device 110 may be embodied as a wrist-based computing device 110 such as the one illustratively shown in FIG. 2. In such embodiments, the wrist-based computing device 110 may be worn on the wrist and/or forearm of the user. As such, the wrist-based computing device 110 may be in the shape of a bracelet, a wristwatch, or any other object including an aperture configured to receive the wrist, forearm, or any other portion of the user's body. In use, the user may interact with the wearable computing device 110 to control one or more aspects and/or characteristics of the controlled computing device 140. For example, in some embodiments, the user may move or otherwise reposition the wearable computing device 110 relative to a skin surface of the user's forearm 200 and/or wrist. In such embodiments, the movement of the wearable computing device 110 may be translated into two-dimensional coordinates (e.g., 'x' and 'y' coordinates) that are transmitted to the controlled computing device 140. Additionally or alternatively, a user may interact with one or more selection devices 124 (e.g., pressure switches, push-button switches, etc.) of the wearable computing device 110 to generate selection commands (e.g., click, double-click, scroll, etc.) that are transmitted to the controlled computing device 140. In that way, the wearable computing device 110 may be used to remotely and/or wirelessly control the movement, position, and/or selection of any number of objects, cursors, pointers, and/or features displayed or otherwise provided by the controlled computing device 140. As such, in some embodiments, the wearable computing device 110 may be used to replace and/or augment the functionality of conventional computer input devices (e.g., mice, trackballs, etc.) connected to or otherwise in communication with the controlled computing device 140. For example, in some embodiments, the wearable computing device 110 may be used in place of a computer mouse to control the movement and/or position of a cursor or pointer displayed by the controlled computing device 140. It should be appreciated that using the wearable computing device 110 to wirelessly control one or more aspects and/or features (e.g., objects, cursors, pointers, etc.) of a separate computing device 140 (e.g., the controlled computing device 140) may be more convenient to the user than using a conventional computer input device.

Figure 2:
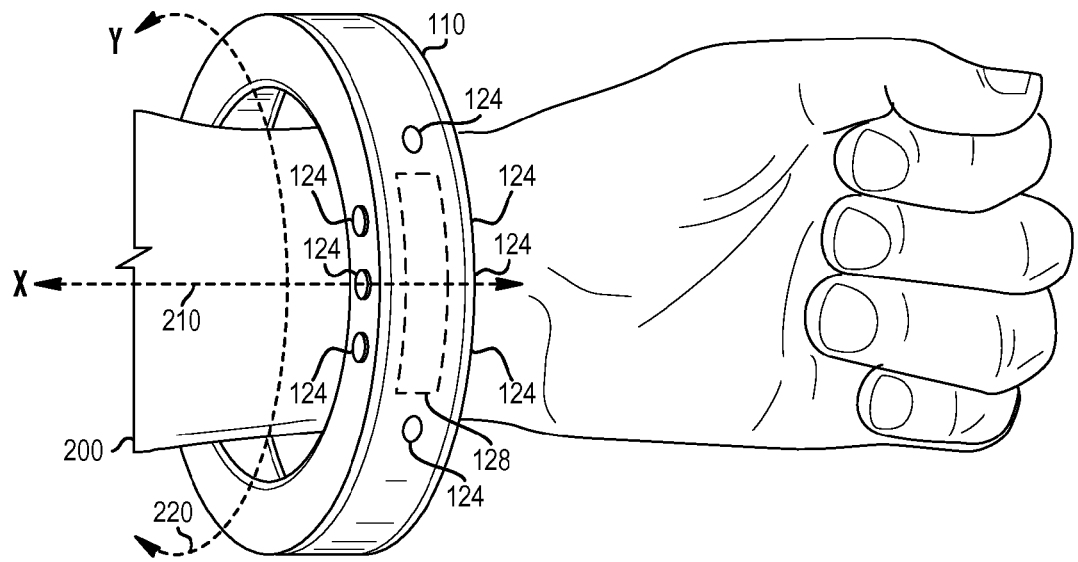
FIG. 2 is an illustrative embodiment of the wearable computing device of the system of FIG. 1 worn on the forearm or wrist of a user.

Referring back to FIG. 1, the wearable computing device 110 (e.g., the wrist-based computing device 110 illustratively shown in FIG. 2) may be embodied as, or otherwise include, any type of computing device configured to be worn, or otherwise carried, by a user and capable of performing the functions described herein including, but not limited to, a wrist-based computing device, a smart watch, an optical head-mounted display, a mobile computing device, a mobile phone, a smart phone, a tablet computing device, a personal digital assistant, a consumer electronic device, a laptop computing device, a desktop computer, and/or other type of computing device. The illustrative wearable computing device 110 includes a processor 112, a memory 114, an input/output (I/O) subsystem 116, communication circuitry 118, a data storage 120, an optical sensor 122, and one or more selection devices 124. In some embodiments, the wearable computing device 110 may include other sensors 126 (e.g., accelerometers, gyroscopes, temperature sensors, location sensors, etc.), a display device 128, and/or one or more peripheral devices 130. Of course, the wearable computing device 110 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 114, or portions thereof, may be incorporated in the processor 112 in some embodiments.

The processor 112 may be embodied as any type of processor capable of performing the functions described herein. For example, the processor 112 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the wearable computing device 110 such as operating systems, applications, programs, libraries, and drivers. The memory 114 is communicatively coupled to the processor 112 via the I/O subsystem 116, which may be embodied as circuitry and/or components to facilitate input/output operations with the processor 112, the memory 114, and other components of the wearable computing device 110. For example, the I/O subsystem 116 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 116 may form a portion of a system-on-a-chip (SoC) and be incorporated, along with the processor 112, the memory 114, and other components of the wearable computing device 110, on a single integrated circuit chip.

The communication circuitry 118 of the wearable computing device 110 may be embodied as any type of communication circuit, device, or collection thereof, capable of enabling communications between the wearable computing device 110 and the controlled computing device 140, the mobile computing device 150, and/or other computing devices. The communication circuitry 118 may be configured to use any one or more communication technologies (e.g., wireless or wired communications) and associated protocols (e.g., Ethernet, Wi-Fi®, WiMAX, etc.) to effect such communication. For example, in some embodiments, the communication circuitry 118 may be embodied as contactless communication circuitry such as near-field communication (NFC) circuitry, Bluetooth® communication circuitry, radio-frequency identification (RFID), or any other short-range communication circuitry for enabling wireless communications between the wearable computing device 110 and the controlled computing device 140, the mobile computing device 150, and/or other computing devices. Additionally or alternatively, the wearable computing device 110 may be configured to communicate with the controlled computing device 140, the mobile computing device 150, and/or other computing devices over any number of various wired and/or wireless communication networks. For example, in some embodiments, the wearable computing device 110 may communicate with the controlled computing device 140 and/or the mobile computing device 150 over a local area network (LAN), a personal area network (PAN), a wide area network (WAN), a cellular network, and/or a publicly-accessible, global network such as the Internet.

The data storage 120 may be embodied as any type of device or devices configured for short-term or long-term storage of data such as, for example, memory devices and circuits, memory cards, hard disk drives, solid-state drives, or other data storage devices. For example, the data storage 120 may be configured to store one or more operating systems to be initialized and/or executed by the wearable computing device 110. In some embodiments, portions of the operating system(s) may be copied to the memory 114 during operations for faster processing and/or any other reason.

Figure 3:
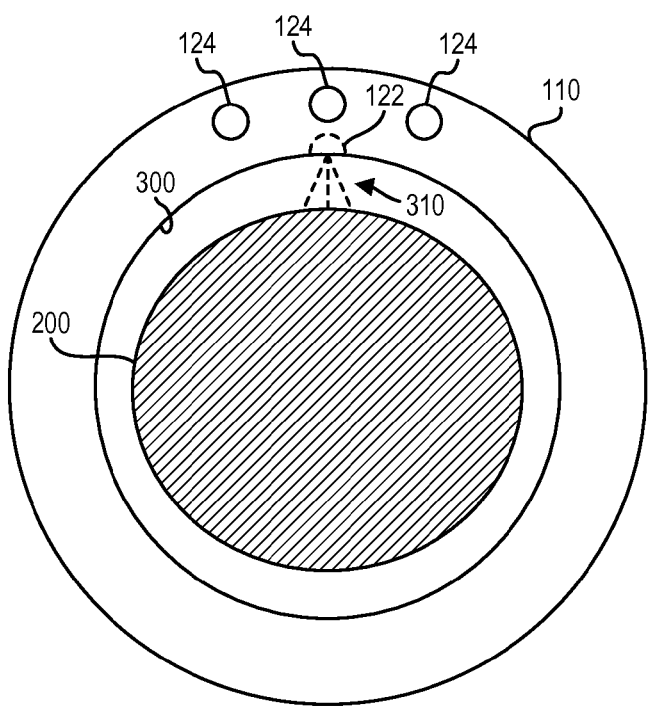
FIG. 3 is a simplified cross-section diagram wearable computing device of FIG. 2 worn on the forearm or wrist of a user.

The optical sensor 122 may be embodied as any type of device or devices configured to capture data indicative of a skin surface of a user's forearm. In some embodiments, the optical sensor 122 may be configured to detect movement of the wearable computing device 110 relative to the skin surface of a user. For example, as illustratively shown in FIGS. 2 and 3, the optical sensor 122 may be configured to detect longitudinal movement 210 and rotational movement 220 of the wearable computing device 110 relative to the skin surface of the user's forearm 200 and/or wrist. To do so, the optical sensor 122 may be positioned on an inside surface of the wearable computing device 110 such that a portion of the skin surface of the user's forearm 200 and/or wrist is in a view 310 of, or otherwise detectable by, the optical sensor 122. In some embodiments, the optical sensor 122 may be embodied as a camera sensor (e.g., camera) configured to capture a plurality of images of the skin surface of the user's forearm 200 and/or wrist. In such embodiments, the captured images may be analyzed to detect movement of the wearable computing device 110 relative to the skin surface of the user's forearm 200 and/or wrist. To facilitate capturing the images, the optical sensor 122 may also include one or more light-emitting diodes (LEDs) and/or laser diodes (LDs) for illumination of the portion of the skin surface of the user's forearm 200 and/or wrist. Additionally or alternatively, the optical sensor 122 may be embodied as an optical sensor typically found in an optical mouse and/or optical input device of a computing device.

In some embodiments, the wearable computing device 110 may include more than one optical sensor 122 in order to increase the accuracy of the sensed data. In such embodiments, the sensor data detected by each of the optical sensors 122 may be fused, or otherwise aggregated, according to any suitable sensor fusing process (e.g., voting, root-mean-square error minimization, etc.). In doing so, finer grained movements of the wearable computing device 110 relative to the skin surface of the user's forearm 200 and/or wrist may be detected.

Additionally or alternatively, referring back to FIG. 1, the sensor data captured by one or more of the optical sensors 122 may be fused with data captured or otherwise obtained from any number of the other sensors 126 (e.g., accelerometers, gyroscopes, temperature sensors, location sensors, etc.) in order to increase the accuracy of the sensed data. For example, in some embodiments, the other sensors 126 of the wearable computing device 110 may be embodied as or otherwise include an accelerometer and a gyroscope. In such embodiments, the accelerometer may be configured to sense linear movements of the wearable computing device 110 and the gyroscope may be configured to sense rotation of the wearable computing device 110. The data sensed from the accelerometer and the gyroscope (e.g., the other sensors 126) may be fused, combined, or otherwise aggregated, with the sensor data captured by the optical sensor(s) 122 according to any suitable sensor fusing and/or combining process (e.g., Kalman filters, machine learning algorithms such as decision trees, a hidden Markov model for sequence determination, etc.). It should be appreciated that data captured by any other type of sensor (e.g., the other sensors 126) may be combined with the sensor data captured by the optical sensor(s) 122.

As discussed, the wearable computing device 110 may include a display device 128 in some embodiments. In such embodiments, the display device 128 may be embodied as any type of touch sensitive display device capable of performing the functions described herein. For example, the display device 128 may be embodied as any type of touch sensitive display device capable of displaying or receiving a selection of one or more user-selectable icons and/or content (e.g., images, text, multimedia objects, etc.) by the user. As such, the display device 128 may include, or otherwise use, any suitable touch sensitive display technology including, for example, a liquid crystal display (LCD), a light emitting diode (LED) display, an organic light emitting diode display (OLED) a cathode ray tube (CRT) display, a plasma display, an electronic ink (e-ink) display, and/or other touch sensitive display usable in an wearable computing device 110 to display user-selectable icons and/or information to the user of the wearable computing device 110.

The controlled computing device 140 may be embodied as any type of computing device capable of performing the functions described herein including, but not limited to, a consumer electronic device, a laptop computing device, a desktop computer, a server, a smart television, a smart appliance, a mobile computing device, a mobile phone, a smart phone, a tablet computing device, a personal digital assistant, a digital picture frame, and/or other type of computing device. As such, the controlled computing device 140 may include devices and structures commonly found in computing devices such as processors, memory devices, communication circuitry, and data storages, which are not shown in FIG. 1 for clarity of the description. In some embodiments, the controlled computing device 140 receives control data from the wearable computing device 110 (e.g., the wrist-based computing device 110 illustratively shown in FIG. 2). The control data may be used by the controlled computing device 140 to control one or more aspects or functions of the controlled computing device 140. For example, in some embodiments, the received control data may be embodied as 'x' and 'y' coordinates used to control movement of a cursor and/or pointer of the controlled computing device 140. Additionally or alternatively, in some embodiments, the received control data may be embodied as selection or command data used to select one or more objects displayed by the controlled computing device 140 and/or instruct the computing device to perform a function. As such, it should be appreciated that the received control data may be used by the controlled computing device 140 as input data for moving and/or selecting any number of objects, cursors, pointers, and/or features displayed by the controlled computing device 140.

In some embodiments, the system 100 may also include a mobile computing device 150, which may wirelessly communicate with the wearable computing device 110. The mobile computing device 150 may be embodied as any type of computing device capable of performing the functions described herein including, but not limited to, a mobile computing device, a mobile phone, a smart phone, a tablet computing device, a personal digital assistant, a consumer electronic device, a laptop computing device, a desktop computer, a wrist-based computing device, a smart watch, an optical head-mounted display, and/or other type of computing device. As such, the mobile computing device 150 may include devices and structures commonly found in computing devices such as processors, memory devices, communication circuitry, and data storages, which are not shown in FIG. 1 for clarity of the description. In some embodiments, the mobile computing device 150 may be configured to transmit data (e.g., contact information, email messages, text messages, social media posts, etc.) to be displayed on the display device 128 of the wearable computing device 110. Additionally or alternatively, the mobile computing device 150 may be configured to receive data (e.g., sensor data, device status information, battery level information, images, etc.) from the wearable computing device 110.

Figure 4:
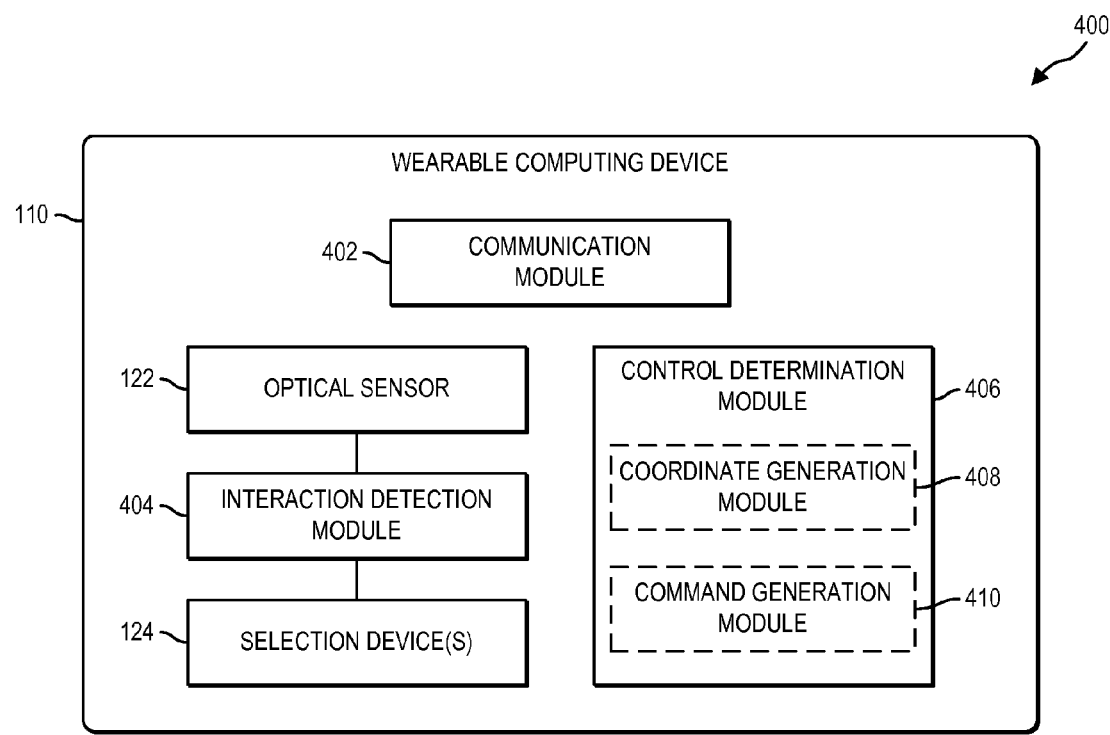
FIG. 4 is a simplified block diagram of at least one embodiment of an environment of the wearable computing device of FIG. 1.

Referring now to FIG. 4, in use, the wearable computing device 110 (e.g., the wrist-based computing device 110 illustratively shown in FIG. 2) establishes an environment 400 during operation. The illustrative environment 400 includes a communication module 402, an interaction detection module 404, and a control determination module 406. In some embodiments, the control determination module 406 may include a coordinate generation module 408 and a command generation module 410. Each of the modules, logic, and other components of the environment 400 may be embodied as hardware, software, firmware, or a combination thereof. It should be appreciated that the wearable computing device 110 may include other components, sub-components, modules, and devices commonly found in a computing device, which are not illustrated in FIG. 4 for clarity of the description.

The communication module 402 of the wearable computing device 110 facilitates communications between components or sub-components of the wearable computing device 110 and the controlled computing device 140 and/or the mobile computing device 150. For example, in some embodiments, the communication module 402 may facilitate transmitting control data (e.g., coordinates, commands, selections, etc.) to the controlled computing device 140. In some embodiments, the communication module 402 may also be configured to facilitate establishing a short-range wireless communication channel (e.g., a NFC communication channel, a Bluetooth® communication channel, etc.) between the wearable computing device 110 and the controlled computing device 140. For example, the communication module 402 may be configured to exchange wireless connection information (e.g., identification data, media access control address, security credentials, etc.) with the controlled computing device 140 in response to the communication circuitry 118 (e.g., NFC circuitry, Bluetooth® circuitry, RFID circuitry, etc.) of the wearable computing device 110 "touching" or being placed in proximity to (e.g., within a reference distance) corresponding communication circuitry of the controlled computing device 140. Additionally, in some embodiments, the communication module 402 facilitates data communications with the mobile computing device 150.

The interaction detection module 404 is configured to receive sensor data from the optical sensor 122. The received sensor data may be indicative of the skin surface of a user's forearm 200 and/or wrist. For example, in some embodiments, the received sensor data may include a plurality of images of the skin surface of the user's forearm 200 and/or wrist captured by the optical sensor 122. Additionally or alternatively, the received sensor data may be indicative of movement of the wearable computing device 110 relative to the skin surface of the user's forearm 200 and/or wrist. For example, rotational movement of the wearable computing device 110 relative to the skin surface of the user's forearm 200 and/or wrist may generate sensor data indicative of a point along a 'y-axis.' In another example, longitudinal movement of the wearable computing device 110 relative to the skin surface of the user's forearm 200 and/or wrist may generate sensor data indicative of a point along an 'x-axis.'

Additionally or alternatively, in some embodiments, the interaction detection module 404 may be configured to receive sensor data from more than one optical sensor 122 and/or any number of the other sensors 126 (e.g., accelerometers, gyroscopes, temperature sensors, location sensors, etc.). In such embodiments, the sensor data detected by each of the optical sensors 122 and/or the other sensors 126 may be fused, combined, or otherwise aggregated, according to any suitable sensor fusing and/or sensor combining process (e.g., voting, root-mean-square error minimization, Kalman filters, machine learning algorithms such as decision trees, a hidden Markov model for sequence determination, etc.). In doing so, the accuracy of the sensed data may be improved.

In some embodiments, the interaction detection module 404 may also be configured to receive selection data from the selection device(s) 124 of the wearable computing device 110. The selection data may be indicative of a signal generated by the selection device(s) 124 in response to the user pressing or otherwise applying pressure to the selection device(s) 124 (e.g., pressing a push-button, applying pressure to a piezoelectric or capacitive sensor, etc.). Additionally or alternatively, the selection data may be indicative of a signal generated by a component and/or device of the wearable computing device 110 in response to the user 'squeezing' a portion of the wearable computing device 110 (e.g., applying pressure to two or more pressure-sensitive external surfaces or areas of the wearable computing device 110). In some embodiments, the received selection data may be indicative of one or more objects, cursors, pointers, and/or features displayed by the controlled computing device 140 that the user desires to select, move, or otherwise interact with. Additionally or alternatively, the received selection data may be indicative of one or more functions the user desires the controlled computing device 140 to perform (e.g., authenticate user, power down, initialize, etc.).

The interaction detection module 404 may also be configured to determine whether the user is interacting with the wearable computing device 110 and/or whether a communication channel is established between the wearable computing device 110 and the controlled computing device 140. In some embodiments, the interaction detection module 404 may do so in order to conserve power (e.g., a battery power source, etc.) of the wearable computing device 110. In use, the interaction detection module 404 may monitor for data and/or signals generated by the communication circuitry 118, the optical sensor 122, the selection device(s) 124, and other sensor(s) 126 of the wearable computing device 110, if any. For example, in some embodiments, the interaction detection module 404 may monitor for signals generated by the optical sensor 122 indicative of a position of the wearable computing device 110, or a change in position of the wearable computing device 110, relative to the skin surface of the user's forearm 200 and/or wrist. The interaction detection module 404 may also monitor for signals indicative of the user's interaction with the selection device(s) 124 and/or the wearable computing device 110 itself (e.g., pressing a push-button, applying pressure to a piezoelectric sensor, applying pressure to an external pressure-sensitive surface, etc.). For example, in some embodiments, the interaction detection module 404 may monitor for one or more signals generated in response to the user 'squeezing' a portion of the wearable computing device 110 (e.g., applying pressure to two or more pressure-sensitive external surfaces or portions of the wearable computing device 110.) Additionally or alternatively, in some embodiments, the interaction detection module 404 monitors for establishment of wireless communications between the wearable computing device 110 and the controlled computing device 140. For example, in some embodiments, the wearable computing device 110 determines whether a short-range wireless communication channel (e.g., a NFC communication channel, a Bluetooth® communication channel, etc.) has been established between the wearable computing device 110 and the controlled computing device 140.

The control determination module 406 is configured to generate control data based on the received sensor data and/or selection data. The generated control data may be embodied as input data configured to cause the controlled computing device 140 to move, select, and/or interact with any number of objects, cursors, pointers, and/or features displayed or provided by the controlled computing device 140. Additionally or alternatively, in some embodiments, the generated control data may be embodied as a command configured to cause (e.g., instruct or otherwise command) the controlled computing device 140 to perform one or more functions in response (e.g., authenticate the user to the controlled computing device 140, power down the controlled computing device 140, initialize the controlled computing device 140, grab content from the controlled computing device 140, etc.). To do so, the control determination module 406 may include the coordinate generation module 408 and the command generation module 410, in some embodiments.

The coordinate generation module 408 may be configured to generate two-dimensional coordinates (e.g., 'x' and 'y' coordinates) based on the sensor data received from the optical sensor 122. For example, in some embodiments, the coordinate generation module 408 may generate an 'x' coordinate based on sensor data received from the optical sensor 122 indicative of longitudinal movement of the wearable computing device 110 relative to the skin surface of the user's forearm 200 and/or wrist. The coordinate generation module 408 may generate a 'y' coordinate based on sensor data received from the optical sensor 122 indicative of rotational movement of the wearable computing device 110 relative to the skin surface of the user's forearm 200 and/or wrist. In embodiments wherein the sensor data received from the optical sensor 122 includes a plurality of images of the skin surface of the user's forearm 200 and/or wrist, the coordinate generation module 408 may analyze the plurality of images to detect differences indicative of movement of the wearable computing device 110 relative to the skin surface of the user's forearm 200 and/or wrist.

It should be appreciated that the coordinate generation module 408 may also generate coordinates other than two-dimensional coordinates. For example, in some embodiments, the coordinate generation module 408 may generate three-dimensional coordinates (e.g., 'x,' 'y,' and 'z' coordinates) or any other type of coordinate suitable for causing the controlled computing device 140 to move or reposition a displayed object, cursor, pointer, and/or feature. In such embodiments, the 'x' and 'y' coordinates may be generated by the sensor data received from the optical sensor(s) 122 whereas the 'z' coordinate may be generated by sensor data received from one of the other sensors 126. For example, in some embodiments, the coordinate generation module 408 may generate a 'z' coordinate based on sensor data received from an accelerometer (e.g., one of the other sensors 126). In such embodiments, the sensor data received from the accelerometer may be indicative of one or more linear movements of the wearable computing device 110 relative to the skin surface of the user's forearm 200 and/or wrist (e.g., moving the inside surface 300 of the wearable computing device 110 closer to or further from the skin surface of the user's forearm 200 and/or wrist). As discussed below, in some embodiments, the 'z' coordinate generated by the coordinate generation module 408 may be used to generate a zooming function (e.g., "zooming-in," "zooming-out," etc.) configured to be performed on the display of the controlled computing device 140.

The command generation module 410 may be configured to generate a selection command based on the selection data received from the one or more selection devices 124. For example, the command generation module 410 may generate a selection command (e.g., click, double-click, scroll, etc.) based on receiving selection data indicative of the user pressing or otherwise applying pressure to the selection device(s) 124. In some embodiments, the command generation module 410 may be configured to generate different selection commands based on the particular selection device(s) 124 from which the selection data is received. For example, the command generation module 410 may generate one selection command (e.g., a single-click selection command) based on receiving selection data from one selection device 124 and a different selection command (e.g., a double-click selection command) based on receiving selection data from a different selection device 124. Additionally or alternatively, the command generation module 410 may generate different selection commands based on multiple selection data received from a single selection device 124. For example, in embodiments wherein the selection device 124 include a pressure-sensitive sensor, the command generation module 410 may generate one selection command (e.g., a single-click selection command) based on receiving selection data indicative of the user applying partial pressure to the selection device 124 and a different selection command (e.g., a double-click selection command) based on receiving selection data indicative of the user applying full pressure to the selection device 124. Additionally or alternatively, the command generation module 410 may generate similar or additional selection commands based on selection or interaction data received from one or more pressure-sensitive external surfaces of the wearable computing device 110. For example, the command generation module 410 may generate a selection command (e.g., click, double-click, scroll, etc.) based on receiving selection data indicative of the user 'squeezing' external portions of the wearable computing device 110 (e.g., applying pressure to two or more pressure-sensitive external surfaces of the wearable computing device 110).

Additionally or alternatively, the command generation module 410 may also generate a command configured to cause (e.g., instruct) the controlled computing device 140 to perform one or more functions in response. For example, in some embodiments, the command generation module 410 may be configured to generate a content grab command based on the selection data. In such embodiments, the content grab command may be configured to cause the controlled computing device 140 to copy or otherwise transmit an object, feature, and/or any other type of content displayed or provided by the controlled computing device 140 to the wearable computing device 110. Additionally or alternatively, the content grab command may be configured to cause the controlled computing device 140 to copy or otherwise transmit an object, feature, and/or any other type of content displayed or provided by the controlled computing device 140 to the mobile computing device 150 and/or any other computing device. In another example, the command generation module 410 may be configured to generate an authentication command based on the selection data and/or one or more gestures performed by the user via the wearable computing device 110. For example, in some embodiments, the command generation module 410 may generate an authentication command that includes the user's authentication credentials in response to determining that the user correctly performed a preconfigured gesture pattern (e.g., a reference gesture pattern). In such embodiments, the controlled computing device 140 may authenticate the user in response to receiving the authentication command. As such, it should be appreciated that the physical gestures performed by the user via the wearable computing device 110 may be akin to a username, a password, and/or a physical token (e.g., a textual username, a textual password, a PIN, a smartcard, etc.) corresponding to the user.

The command generation module 410 may also be configured to generate a display command based on sensor data received from the other sensor(s) 126 and/or the selection data. For example, the command generation module 410 may generate a zoom command configured to cause a display of the controlled computing device 140 to be "zoomed-in" and/or "zoomed-out." As discussed, in some embodiments, the wearable computing device 110 may include an accelerometer (e.g., one of the other sensors 126) configured to sense linear movement of the wearable computing device 110 relative to the skin surface of the user's forearm 200 and/or wrist (e.g., moving the inside surface 300 of the wearable computing device 110 closer to or further from the skin surface of the user's forearm 200 and/or wrist). In such embodiments, the coordinate generation module 308 may generate a 'z' coordinate indicative of the sensed linear movement. In response to generation of a 'z' coordinate indicative of the wearable computing device 110 being moved closer to the skin surface of the user's forearm 200 and/or wrist, the command generation module 410 may be configured to generate a "zooming-in" command. Additionally or alternatively, in response to generation of a 'z' coordinate indicative of the wearable computing device 110 being moved further from the skin surface of the user's forearm 200 and/or wrist, the command generation module 410 may be configured to generate a "zooming-out" command. In some embodiments, the command generation module 410 may be configured to generate a "zooming-in" and/or a "zooming-out" command in response to generation of a 'z' coordinate and selection of one or more of the selection devices 124 by the user.

The control determination module 406 is also configured to transmit the generated control data, coordinates, and/or commands to the controlled computing device 140. As discussed, the generated control data, coordinates, and/or commands may be embodied as input data configured to cause the controlled computing device 140 to perform one or more functions and/or move, select, or interact with any number of objects, cursors, pointers, and/or features displayed or provided by the controlled computing device 140. In that way, the wearable computing device 110 may be used as an input device to the controlled computing device 140.

Figure 5:
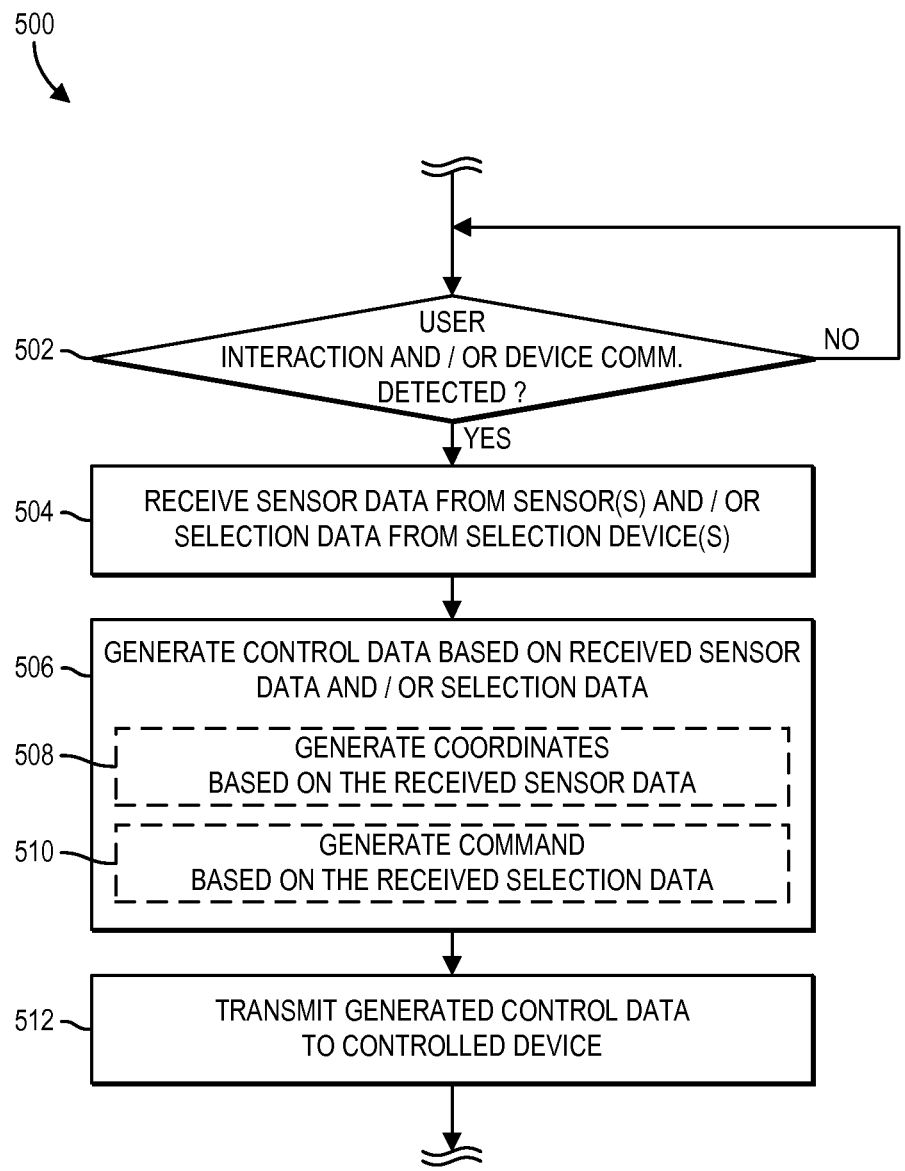
FIG. 5 is a simplified flow diagram of at least one embodiment of a method for remotely controlling a computing device that may be executed by the wearable computing device of FIGS. 1 and 4.

Referring now to FIG. 5, the wearable computing device 110 (e.g., the wrist-based computing device 110 illustratively shown in FIG. 2) may execute a method 500 for remotely controlling the controlled computing device 140. The method 500 begins with block 502 in which the wearable computing device 110 determines whether the user is interacting with the wearable computing device 110. To do so, the wearable computing device 110 monitors for data and/or signals generated by the optical sensor 122, the selection device(s) 124, and/or the other sensor(s) 126. For example, in some embodiments, the wearable computing device 110 monitors for signals generated by the optical sensor 122 indicative of a position of the wearable computing device 110, or a change in position of the wearable computing device 110, relative to the skin surface of the user's forearm 200 and/or wrist. The wearable computing device 110 may also monitor for signals indicative of the user's interaction with the selection device(s) 124 and/or the wearable computing device 110 itself (e.g., pressing a push-button, applying pressure to a piezoelectric sensor, applying pressure to one or more pressure sensitive external surfaces, etc.). For example, in some embodiments, the user may 'squeeze' a portion of the wearable computing device 110 (e.g., apply pressure to two or more pressure-sensitive external surfaces) to generate a signal indicative of the user's interaction with the wearable computing device 110. Additionally or alternatively, in some embodiments, the wearable computing device 110 monitors for establishment of wireless communications between the wearable computing device 110 and the controlled computing device 140. For example, in some embodiments, the wearable computing device 110 determines whether a short-range wireless communication channel (e.g., a NFC communication channel, a Bluetooth® communication channel, etc.) has been established between the wearable computing device 110 and the controlled computing device 140. If, in block 502, the wearable computing device 110 determines that the user is interacting with the wearable computing device 110 and/or that a wireless communication channel has been established with the controlled computing device 140, the method 500 advances to block 504. If, however, the wearable computing device 110 determines instead that the user is not interacting with the wearable computing device 110 and/or that a wireless communication channel has not been established with the controlled computing device 140, the method 500 loops back to block 502 to continue monitoring for user interaction and/or communication channel establishment.

In block 504, the wearable computing device 110 receives sensor data from the optical sensor 122 of the wearable computing device 110. In some embodiments, the received sensor data is indicative of the skin surface of the user's forearm 200 and/or wrist. Additionally or alternatively, the received sensor data includes a plurality of images of the skin surface of the forearm 200 and/or wrist of the user captured by the optical sensor 122. In some embodiments, the received sensor data is indicative of movement of the wearable computing device 110 relative to the skin surface of the user's forearm 200 and/or wrist. For example, rotational movement of the wearable computing device 110 relative to the skin surface of the user's forearm 200 and/or wrist may generate sensor data indicative of a point along a 'y-axis.' In another example, longitudinal movement of the wearable computing device 110 relative to the skin surface of the user's forearm 200 and/or wrist may generate sensor data indicative of a point along an 'x-axis.'

Additionally or alternatively, in block 504, the wearable computing device 110 receives selection data from one or more of the selection device(s) 124 of the wearable computing device 110. In some embodiments, the selection data is indicative of the user's interaction with the selection device(s) 124. For example, the selection data may be indicative of a signal generated by the selection device(s) 124 in response to the user pressing or otherwise applying pressure to the selection device(s) 124 (e.g., pressing a push-button, applying pressure to a piezoelectric sensor, etc.). In another example, the selection data may be indicative of a signal generated by a component and/or device of the wearable computing device 110 in response to the user 'squeezing' a portion of the wearable computing device 110 (e.g., applying pressure to two or more pressure-sensitive external surfaces of the wearable computing device 110).

In block 506, the wearable computing device 110 generates control data based on the received sensor data and/or selection data. The generated control data may be embodied as input data configured to cause the controlled computing device 140 to move or reposition any number of objects, cursors, pointers, and/or features displayed by the controlled computing device 140. For example, in block 508, the wearable computing device 110, may generate two-dimensional coordinates (e.g., 'x' and 'y' coordinates) based on the sensor data received from the optical sensor 122. It should be appreciated that the wearable computing device 110 may also generate coordinates other than two-dimensional coordinates. For example, in some embodiments, the wearable computing device 110 may generate three-dimensional coordinates (e.g., 'x,' 'y,' and 'z' coordinates) or any other type of coordinate suitable for causing the controlled computing device 140 to move or reposition a displayed object, cursor, pointer, and/or feature.

Additionally or alternatively, the generated control data may be embodied as input data configured to cause (e.g., instruct or otherwise command) the computing device to perform one or more functions (e.g., user authenticate, power down, initialize, etc.) and/or select any number of objects, cursors, pointers, and/or features displayed by the controlled computing device 140. In some embodiments, in block 510, the wearable computing device 110 may generate a command based on the selection data received from the one or more selection devices 124. For example, the wearable computing device 110 may generate a selection command (e.g., click, double-click, scroll, etc.) based on receiving selection data indicative of the user pressing or otherwise applying an amount of pressure to the selection device(s) 124 (e.g., pressing a push-button, applying pressure to a piezoelectric sensor, etc.). It should be appreciated that different selection device(s) 124 of the wearable computing device 110 may be associated with a different selection commands. For example, in some embodiments, one selection device 124 may be associated with a single-click selection command. A different selection device 124 may be associated with a double-click selection command. The same selection device 124 may also be associated with more than one selection commands. For example, in some embodiments, application of full pressure to a pressure-sensitive selection device 124 may be associated with a double-click selection command, whereas application of partial pressure (e.g., less than full pressure) to the pressure-sensitive selection device 124 may be associated with a single-click selection command. Additionally or alternatively, the wearable computing device 110 may generate similar or additional selection commands based on selection or interaction data received from one or more pressure-sensitive external surfaces of the wearable computing device 110. For example, the wearable computing device 110 may generate a selection command (e.g., click, double-click, scroll, etc.) based on receiving selection data indicative of the user 'squeezing' external portions of the wearable computing device 110 (e.g., applying pressure to two or more pressure-sensitive external surfaces). It should be appreciated that, in some embodiments, the selection commands generated in response to the user interacting with the selection device(s) 124 and/or 'squeezing' external surfaces of the wearable computing device 110 may be different from the control data generated in response to the user moving the wearable computing device 110 longitudinally, rotationally, and/or linearly relative to the skin surface of the user's forearm 200 and/or wrist.

In block 512, the wearable computing device 110 transmits the generated control data to the controlled computing device 140. In embodiments wherein coordinates and/or commands are generated from the control data, the coordinates and/or commands are transmitted to the controlled computing device 140. As discussed, the transmitted control commands may be utilized by the controlled computing device 140 to cause a function to be performed and/or one or more objects, cursors, pointers, and/or features of the controlled computing device 140 to be interacted with, moved, and/or selected. In that way, the wearable computing device 110 may be used as an input device to the controlled computing device 140.

Examples

Illustrative examples of the technologies disclosed herein are provided below. An embodiment of the technologies may include any one or more, and any combination of, the examples described below.

Example 1 includes a wearable computing device to control a separate computing device, the wearable computing device including an interaction detection module to receive sensor data from an optical sensor of the wearable computing device, wherein the sensor data includes data indicative of a skin surface of a forearm of a user of the wearable computing device; and a control determination module to (i) generate control data based on the received sensor data and (ii) transmit the generated control data to the separate computing device.

Example 2 includes the subject matter of Example 1, and wherein the received sensor data includes a plurality of images of the skin surface of the forearm of the user captured by the optical sensor.

Example 3 includes the subject matter of any of Examples 1 and 2, and wherein to generate the control data includes to generate coordinates based on the received sensor data; and wherein to transmit the generated control data includes to transmit the generated coordinates to the separate computing device.

Example 4 includes the subject matter of any of Examples 1-3, and wherein the interaction detection module further to detect interaction with the wearable computing device by the user.

Example 5 includes the subject matter of any of Examples 1-4, and wherein to detect interaction with the wearable computing device includes to detect movement of the wearable computing device relative to the skin surface of the forearm of the user.

Example 6 includes the subject matter of any of Examples 1-5, and wherein to generate the control data includes to (i) generate an x-coordinate based on detection of longitudinal movement of the wearable computing device relative to the skin surface of the forearm of the user and (ii) generate a y-coordinate based on detection of rotational movement of the wearable computing device relative to the skin surface of the forearm of the user; and wherein to transmit the generated control data includes to transmit the generated x-coordinate and y-coordinate to the separate computing device.

Example 7 includes the subject matter of any of Examples 1-6, and wherein the sensor data received from the optical sensor includes first sensor data; wherein the interaction detection module further to receive second sensor data from another sensor of the wearable computing device; wherein to generate the control data includes to (i) generate an x-coordinate from the first sensor data based on detection of longitudinal movement of the wearable computing device relative to the skin surface of the forearm of the user, (ii) generate a y-coordinate from the first sensor data based on detection of rotational movement of the wearable computing device relative to the skin surface of the forearm of the user, and (iii) generate a z-coordinate from the second sensor data based on detection of linear movement of the wearable computing device relative to the skin surface of the forearm of the user; and wherein to transmit the generated control data includes to transmit the generated x-coordinate, y-coordinate, and z-coordinate to the separate computing device.

Example 8 includes the subject matter of any of Examples 1-7, and wherein the interaction detection module further to receive selection data from a selection device of the wearable computing device; and wherein the control determination module further to: (i) generate at least one of (a) a zoom-in command based on a first z-coordinate indicative of linear movement of the wearable computing device closer to the skin surface of the forearm of the user or (b) a zoom-out command based on a second z-coordinate indicative of linear movement of the wearable computing device away from the skin surface of the forearm of the user and selection data received from a selection device of the wearable computing device, and (ii) transmit the generated zoom-in or zoom-out command to the separate computing device.

Example 9 includes the subject matter of any of Examples 1-8, and wherein the interaction detection module further to receive selection data from a selection device of the wearable computing device; and wherein the control determination module further to (i) generate a command based on the received selection data and (ii) transmit the generated command to the separate computing device.

Example 10 includes the subject matter of any of Examples 1-9, and wherein to generate the command includes to generate an object selection command for selection of an object displayed by the separate computing device.

Example 11 includes the subject matter of any of Examples 1-10, and wherein to generate the command includes to generate an object grab command for selection and transfer of an object displayed by the separate computing device.

Example 12 includes the subject matter of any of Examples 1-11, and wherein to generate the command includes to generate an authentication command for authentication of a user to the separate computing device.

Example 13 includes the subject matter of any of Examples 1-12, and wherein the selection device includes a piezoelectric sensor or a push-button.

Example 14 includes the subject matter of any of Examples 1-13, and wherein the wearable computing device includes a wrist-based wearable computing device.

Example 15 includes a method for controlling a separate computing device, the method including receiving, by a wearable computing device, sensor data from an optical sensor of the wearable computing device, wherein the sensor data includes data indicative of a skin surface of a forearm of a user of the wearable computing device; generating, by the wearable computing device, control data based on the received sensor data; and transmitting, by the wearable computing device, the generated control data to the separate computing device.

Example 16 includes the subject matter of Example 15, and wherein the received sensor data includes a plurality of images of the skin surface of the forearm of the user captured by the optical sensor.

Example 17 includes the subject matter of any of Examples 15 and 16, and wherein generating the control data includes generating coordinates based on the received sensor data; and wherein transmitting the generated control data includes transmitting the generated coordinates to the separate computing device.

Example 18 includes the subject matter of any of Examples 15-17, and further including detecting, by the wearable computing device, interaction with the wearable computing device by the user.

Example 19 includes the subject matter of any of Examples 15-18, and wherein detecting interaction with the wearable computing device includes detecting movement of the wearable computing device relative to the skin surface of the forearm of the user.

Example 20 includes the subject matter of any of Examples 15-19, and wherein generating the control data includes (i) generating an x-coordinate based on detection of longitudinal movement of the wearable computing device relative to the skin surface of the forearm of the user and (ii) generating a y-coordinate based on detection of rotational movement of the wearable computing device relative to the skin surface of the forearm of the user; and wherein transmitting the generated control data includes transmitting the generated x-coordinate and y-coordinate to the separate computing device.

Example 21 includes the subject matter of any of Examples 15-20, and wherein receiving the sensor data from the optical sensor includes receiving first sensor data; and further including receiving, by the wearable computing device, second sensor data from another sensor of the wearable computing device; wherein generating the control data includes (i) generating an x-coordinate from the first sensor data based on detection of longitudinal movement of the wearable computing device relative to the skin surface of the forearm of the user, (ii) generating a y-coordinate from the first sensor data based on detection of rotational movement of the wearable computing device relative to the skin surface of the forearm of the user, and (iii) generating a z-coordinate from the second sensor data based on detection of linear movement of the wearable computing device relative to the skin surface of the forearm of the user; and wherein transmitting the generated control data includes transmitting the generated x-coordinate, y-coordinate, and z-coordinate to the separate computing device.

Example 22 includes the subject matter of any of Examples 15-21, and further including receiving selection data from a selection device of the wearable computing device; generating at least one of (a) a zoom-in command based on a first z-coordinate indicative of linear movement of the wearable computing device closer to the skin surface of the forearm of the user or (b) a zoom-out command based on a second z-coordinate indicative of linear movement of the wearable computing device away from the skin surface of the forearm of the user and selection data received from a selection device of the wearable computing device; and transmitting the generated zoom-in or zoom-out command to the separate computing device.

Example 23 includes the subject matter of any of Examples 15-22, and further including receiving, by the wearable computing device, selection data from a selection device of the wearable computing device; generating, by the wearable computing device, a command based on the received selection data; and transmitting, by the wearable computing device, the generated command to the separate computing device.

Example 24 includes the subject matter of any of Examples 15-23, and wherein generating the command includes generating an object selection command for selection of an object displayed by the separate computing device.

Example 25 includes the subject matter of any of Examples 15-24, and wherein generating the command includes generating an object grab command for selection and transfer of an object displayed by the separate computing device.

Example 26 includes the subject matter of any of Examples 15-25, and wherein generating the command includes generating an authentication command for authentication of the user to the separate computing device.

Example 27 includes the subject matter of any of Examples 15-26, and wherein the selection device includes a piezoelectric sensor or a push-button.

Example 28 includes the subject matter of any of Examples 15-27, and wherein the wearable computing device includes a wrist-based wearable computing device.

Example 29 includes a wearable computing device to control a separate computing device, the wearable computing device including a processor; and a memory having stored therein a plurality of instructions that when executed by the processor cause the wearable computing device to perform the method of any of Examples 15-28.

Example 30 includes one or more machine-readable media including a plurality of instructions stored thereon that in response to being executed result in a wearable computing device performing the method of any of Examples 15-28.

Example 31 includes a wearable computing device to control a separate computing device, the wearable computing device including means for receiving sensor data from an optical sensor of the wearable computing device, wherein the sensor data includes data indicative of a skin surface of a forearm of a user of the wearable computing device; means for generating control data based on the received sensor data; and means for transmitting the generated control data to the separate computing device.

Example 32 includes the subject matter of Example 31, and wherein the received sensor data includes a plurality of images of the skin surface of the forearm of the user captured by the optical sensor.

Example 33 includes the subject matter of any of Examples 31 and 32, and wherein the means for generating the control data includes means for generating coordinates based on the received sensor data; and wherein the means for transmitting the generated control data includes means for transmitting the generated coordinates to the separate computing device.

Example 34 includes the subject matter of any of Examples 31-33, and further including means for detecting interaction with the wearable computing device by the user.

Example 35 includes the subject matter of any of Examples 31-34, and wherein the means for detecting interaction with the wearable computing device includes means for detecting movement of the wearable computing device relative to the skin surface of the forearm of the user.

Example 36 includes the subject matter of any of Examples 31-35, and wherein the means for generating the control data includes (i) means for generating an x-coordinate based on detection of longitudinal movement of the wearable computing device relative to the skin surface of the forearm of the user and (ii) means for generating a y-coordinate based on detection of rotational movement of the wearable computing device relative to the skin surface of the forearm of the user; and wherein the means for transmitting the generated control data includes means for transmitting the generated x-coordinate and y-coordinate to the separate computing device.

Example 37 includes the subject matter of any of Examples 31-36, and wherein the means for receiving the sensor data from the optical sensor includes means for receiving first sensor data; and further including means for receiving second sensor data from another sensor of the wearable computing device; wherein the means for generating the control data includes (i) means for generating an x-coordinate from the first sensor data based on detection of longitudinal movement of the wearable computing device relative to the skin surface of the forearm of the user, (ii) means for generating a y-coordinate from the first sensor data based on detection of rotational movement of the wearable computing device relative to the skin surface of the forearm of the user, and (iii) means for generating a z-coordinate from the second sensor data based on detection of linear movement of the wearable computing device relative to the skin surface of the forearm of the user; and wherein the means for transmitting the generated control data includes means for transmitting the generated x-coordinate, y-coordinate, and z-coordinate to the separate computing device.

Example 38 includes the subject matter of any of Examples 31-37, and further including means for receiving selection data from a selection device of the wearable computing device; means for generating at least one of (a) a zoom-in command based on a first z-coordinate indicative of linear movement of the wearable computing device closer to the skin surface of the forearm of the user or (b) a zoom-out command based on a second z-coordinate indicative of linear movement of the wearable computing device away from the skin surface of the forearm of the user and selection data received from a selection device of the wearable computing device; and means for transmitting the generated zoom-in or zoom-out command to the separate computing device.

Example 39 includes the subject matter of any of Examples 31-38, and further including means for receiving selection data from a selection device of the wearable computing device; means for generating a command based on the received selection data; and means for transmitting the generated command to the separate computing device.

Example 40 includes the subject matter of any of Examples 31-39, and wherein the means for generating the command includes means for generating an object selection command for selection of an object displayed by the separate computing device.

Example 41 includes the subject matter of any of Examples 31-40, and wherein the means for generating the command includes means for generating an object grab command for selection and transfer of an object displayed by the separate computing device.

Example 42 includes the subject matter of any of Examples 31-41, and wherein the means for generating the command includes means for generating an authentication command for authentication of the user to the separate computing device.

Example 43 includes the subject matter of any of Examples 31-42, and wherein the selection device includes a piezoelectric sensor or a push-button.

Example 44 includes the subject matter of any of Examples 31-43, and wherein the wearable computing device includes a wrist-based wearable computing device.

The invention claimed is:

1. A wearable computing device to control a separate computing device, the wearable computing device comprising:
   an interaction detection module to (i) receive first sensor data from an optical sensor of the wearable computing device and (ii) receive second sensor data from another sensor of the wearable computing device, wherein the first sensor data comprises data indicative of a skin surface of a forearm of a user of the wearable computing device; and
   a control determination module to (i) generate control data for control of the separate computing device based on the received first sensor data and the received second sensor data and (ii) transmit the generated control data to the separate computing device, wherein to generate the control data comprises to generate a z-coordinate from the second sensor data based on detection of linear movement of the wearable computing device relative to the skin surface of the forearm of the user and in a direction perpendicular to the skin surface.

2. The wearable computing device of claim 1, wherein the received first sensor data comprises a plurality of images of the skin surface of the forearm of the user captured by the optical sensor.

3. The wearable computing device of claim 1, wherein to generate the control data comprises to generate coordinates based on the received first sensor data; and
   wherein to transmit the generated control data comprises to transmit the generated coordinates to the separate computing device.

4. The wearable computing device of claim 1, wherein the interaction detection module further to detect interaction with the wearable computing device by the user.

5. The wearable computing device of claim 4, wherein to detect interaction with the wearable computing device comprises to detect movement of the wearable computing device relative to the skin surface of the forearm of the user.

6. The wearable computing device of claim 5, wherein to generate the control data comprises to (i) generate an x-coordinate based on detection of longitudinal movement of the wearable computing device relative to the skin surface of the forearm of the user and (ii) generate a y-coordinate based on detection of rotational movement of the wearable computing device relative to the skin surface of the forearm of the user; and
   wherein to transmit the generated control data comprises to transmit the generated x-coordinate and y-coordinate to the separate computing device.

7. The wearable computing device of claim 5,
   wherein to generate the control data comprises to (i) generate an x-coordinate from the first sensor data based on detection of longitudinal movement of the wearable computing device relative to the skin surface of the forearm of the user and (ii) generate a y-coordinate from the first sensor data based on detection of rotational movement of the wearable computing device relative to the skin surface of the forearm of the user; and wherein to transmit the generated control data comprises to transmit the generated x-coordinate, y-coordinate, and z-coordinate to the separate computing device.

8. The wearable computing device of claim 1, wherein the interaction detection module further to receive selection data from a selection device of the wearable computing device; and wherein the control determination module further to: (i) generate at least one of (a) a zoom-in command based on a first z-coordinate indicative of linear movement of the wearable computing device closer to the skin surface of the forearm of the user or (b) a zoom-out command based on a second z-coordinate indicative of linear movement of the wearable computing device away from the skin surface of the forearm of the user and selection data received from a selection device of the wearable computing device, and (ii) transmit the generated zoom-in or zoom-out command to the separate computing device.

9. The wearable computing device of claim 1, wherein the interaction detection module further to receive selection data from a selection device of the wearable computing device; and wherein the control determination module further to (i) generate a command based on the received selection data and (ii) transmit the generated command to the separate computing device.

10. The wearable computing device of claim 9, wherein to generate the command comprises to generate at least one of (i) an object selection command for selection of an object displayed by the separate computing device, (ii) an object grab command for selection and transfer of an object displayed by the separate computing device, or (iii) an authentication command for authentication of the user to the separate computing device.

11. The wearable computing device of claim 9, wherein the selection device comprises a piezoelectric sensor or a push-button.

12. The wearable computing device of claim 1, wherein the wearable computing device comprises a wrist-based wearable computing device.

13. One or more non-transitory machine-readable media comprising a plurality of instructions stored thereon that in response to being executed by a wearable computing device, cause the wearable computing device to:

receive first sensor data from an optical sensor of the wearable computing device, wherein the first sensor data comprises data indicative of a skin surface of a forearm of a user of the wearable computing device;

receive second sensor data from another sensor of the wearable computing device;

generate control data for control of a separate computing device based on the received first sensor data and the received second sensor data, wherein to generate the control data comprises to generate a z-coordinate from the second sensor data based on detection of linear movement of the wearable computing device relative to the skin surface of the forearm of the user and in a direction perpendicular to the skin surface; and transmit the generated control data to the separate computing device.

14. The one or more non-transitory machine-readable media of claim 13, wherein the received first sensor data comprises a plurality of images of the skin surface of the forearm of the user captured by the optical sensor.

15. The one or more non-transitory machine-readable media of claim 13, wherein to generate the control data comprises to generate coordinates based on the received first sensor data; and wherein to transmit the generated control data comprises to transmit the generated coordinates to the separate computing device.

16. The one or more non-transitory machine-readable media of claim 13, wherein the plurality of instructions further cause the wearable computing device to detect interaction with the wearable computing device by the user.

17. The one or more non-transitory machine-readable media of claim 16, wherein to detect interaction with the wearable computing device comprises to detect movement of the wearable computing device relative to the skin surface of the forearm of the user.

18. The one or more non-transitory machine-readable media of claim 17, wherein to generate the control data comprises to (i) generate an x-coordinate based on detection of longitudinal movement of the wearable computing device relative to the skin surface of the forearm of the user and (ii) generate a y-coordinate based on detection of rotational movement of the wearable computing device relative to the skin surface of the forearm of the user; and wherein to transmit the generated control data comprises to transmit the generated x-coordinate and y-coordinate to the separate computing device.

19. The one or more non-transitory machine-readable media of claim 17, wherein to generate the control data comprises to (i) generate an x-coordinate from the first sensor data based on detection of longitudinal movement of the wearable computing device relative to the skin surface of the forearm of the user and (ii) generate a y-coordinate from the first sensor data based on detection of rotational movement of the wearable computing device relative to the skin surface of the forearm of the user; and wherein to transmit the generated control data comprises to transmit the generated x-coordinate, y-coordinate, and z-coordinate to the separate computing device.

20. The one or more non-transitory machine-readable media of claim 13, wherein the plurality of instructions further cause the wearable computing device to:

receive selection data from a selection device of the wearable computing device;

generate at least one of (a) a zoom-in command based on a first z-coordinate indicative of linear movement of the wearable computing device closer to the skin surface of the forearm of the user or (b) a zoom-out command based on a second z-coordinate indicative of linear movement of the wearable computing device away from the skin surface of the forearm of the user and selection data received from a selection device of the wearable computing device; and transmit the generated zoom-in or zoom-out command to the separate computing device.

21. The one or more non-transitory machine-readable media of claim 13, wherein the plurality of instructions further cause the wearable computing device to:

receive selection data from a selection device of the wearable computing device;

generate a command based on the received selection data; and transmit the generated command to the separate computing device.

22. The one or more non-transitory machine-readable media of claim 21, wherein to generate the command comprises to generate at least one of (i) an object selection command for selection of an object displayed by the separate computing device, (ii) an object grab command for selection and transfer of an object displayed by the separate computing device, or (iii) an authentication command for authentication of the user to the separate computing device.

23. A method for controlling a separate computing device, the method comprising:

receiving, by a wearable computing device, first sensor data from an optical sensor of the wearable computing device, wherein the first sensor data comprises data indicative of a skin surface of a forearm of a user of the wearable computing device;

receiving, by the wearable computing device, second sensor data from another sensor of the wearable computing device;

generating, by the wearable computing device, control data for control of the separate computing device based on the received first sensor data and the received second sensor data, wherein generating the control data comprises generating a z-coordinate from the second sensor data based on detection of linear movement of the wearable computing device relative to the skin surface of the forearm of the user and in a direction perpendicular to the skin surface; and transmitting, by the wearable computing device, the generated control data to the separate computing device.

24. The method of claim 23, further comprising:

detecting, by the wearable computing device, movement of the wearable computing device relative to the skin surface of the forearm of the user;

wherein generating the control data comprises (i) generating an x-coordinate based on detection of longitudinal movement of the wearable computing device relative to the skin surface of the forearm of the user and (ii) generating a y-coordinate based on detection of rotational movement of the wearable computing device relative to the skin surface of the forearm of the user; and wherein transmitting the generated control data comprises transmitting the generated x-coordinate and y-coordinate to the separate computing device.

25. The method of claim 23, further comprising:

receiving, by the wearable computing device, selection data from a selection device of the wearable computing device;

generating, by the wearable computing device, a command based on the received selection data; and transmitting, by the wearable computing device, the generated command to the separate computing device.

* * * * *